United States Patent [19]
Ylinen

[11] 3,905,200
[45] Sept. 16, 1974

[54] CABLE LAYING ATTACHMENT FOR VEHICLES

[76] Inventor: William A. Ylinen, 9711 SE. Butte Ave., Vancouver, Wash. 98664

[22] Filed: Mar. 18, 1974

[21] Appl. No.: 451,756

[52] U.S. Cl. .................................. 61/72.6; 37/193
[51] Int. Cl.² ........................................... F16L 1/00
[58] Field of Search ......... 61/72.6, 72.1, 72.5, 72.7; 242/75; 226/198; 37/193

[56] References Cited
UNITED STATES PATENTS

| | | | |
|---|---|---|---|
| 3,307,363 | 3/1967 | Kinnan | 61/72.6 |
| 3,400,542 | 9/1968 | Davis | 61/72.6 |
| 3,431,741 | 3/1969 | Kinnan | 61/72.6 |
| 3,486,344 | 12/1969 | Ylinen | 61/72.6 |
| 3,546,887 | 12/1970 | Helmus | 61/72.6 X |
| 3,788,575 | 1/1974 | Boettcher | 61/72.6 X |

*Primary Examiner*—Jacob Shapiro
*Attorney, Agent, or Firm*—Eugene M. Eckelman

[57] ABSTRACT

An elongated beam member is arranged for attachment at its front end to a forward portion of a vehicle. A telescoping support arm is arranged for pivotal connection at one of its ends to the vehicle and at its other end to the beam member. Such arm has powered telescoping length adjustment by an internal fluid operated cylinder. The rearward end of the elongated beam member pivotally supports a plow blade carrier and a cable guide chute, together with a vibrator on the plow blade carrier. Power means such as fluid operated cylinders are utilized to raise and lower the beam member, to raise and lower the plow blade, to adjust the beam member on a longitudinal axis, and to adjust the longitudinal pivotal alignment between the plow blade carrier and the beam member. Warning and vehicle shut-off means are employed to prevent damage to the cable being laid in the event such cable is subjected to too much tension.

7 Claims, 10 Drawing Figures

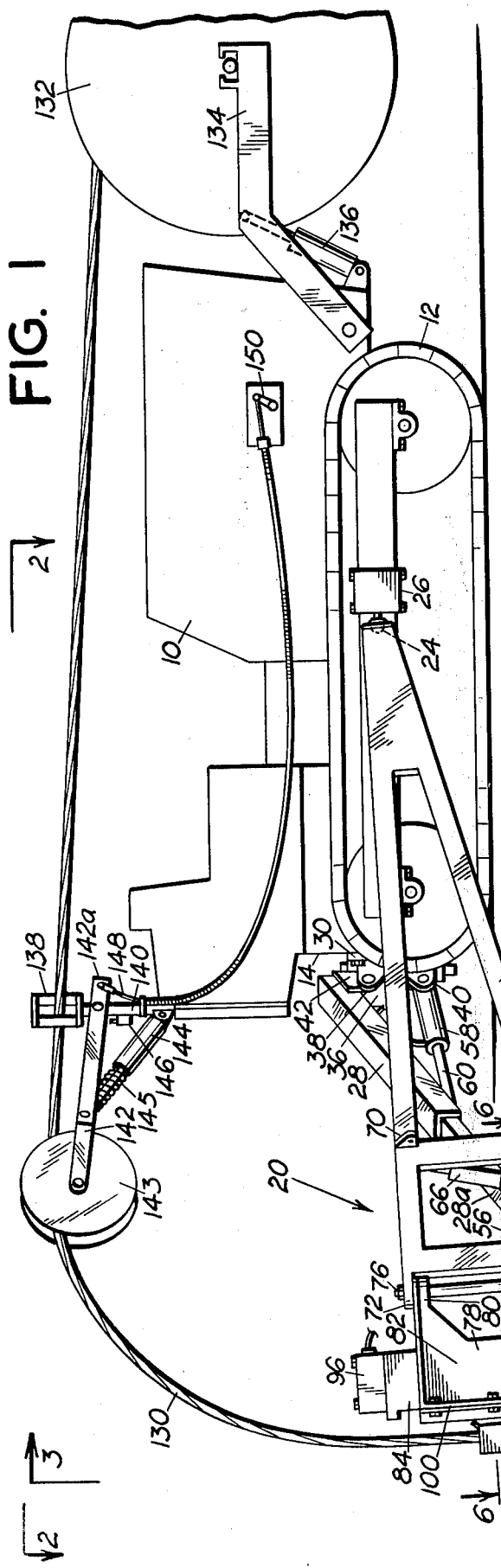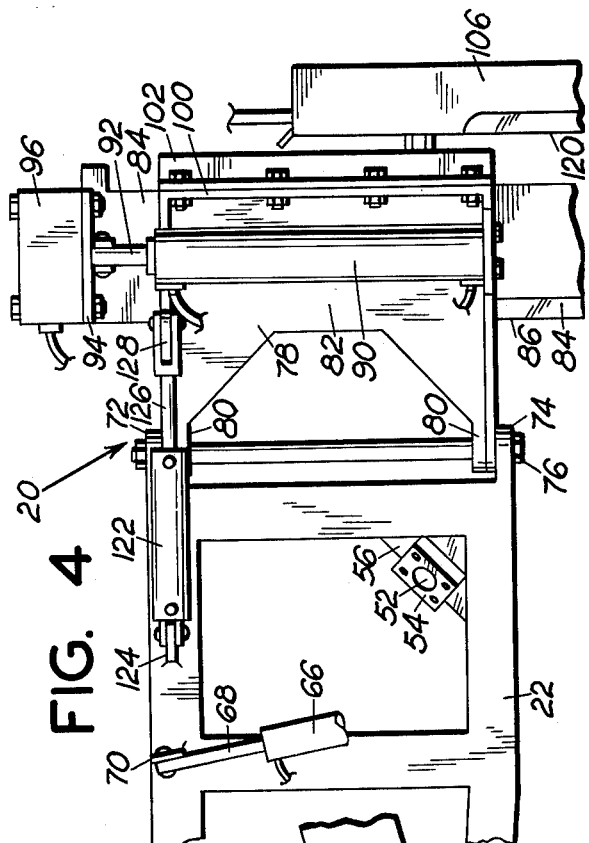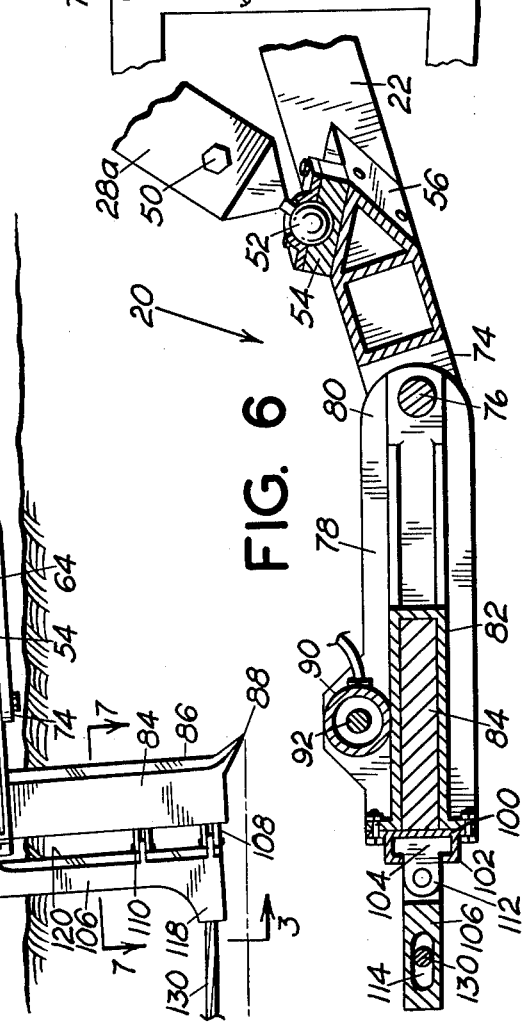

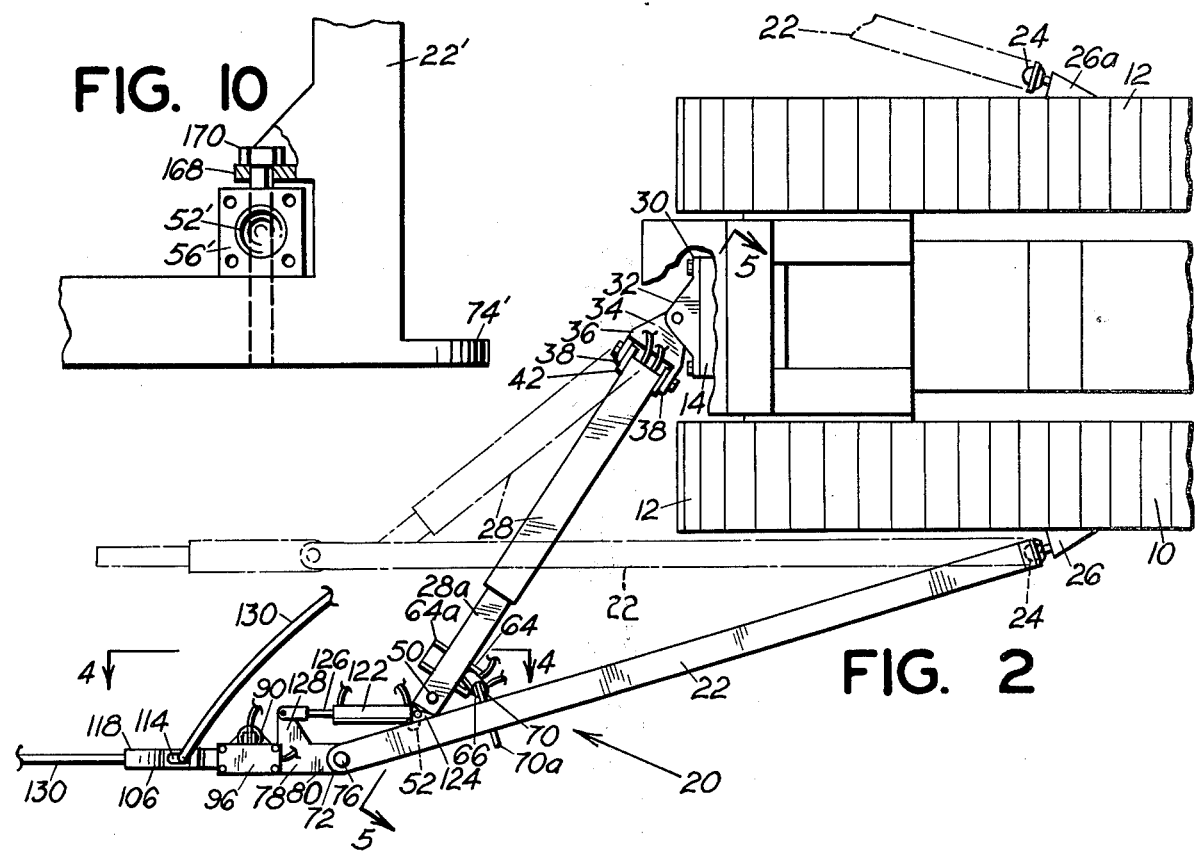
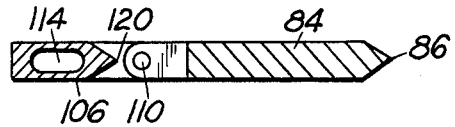
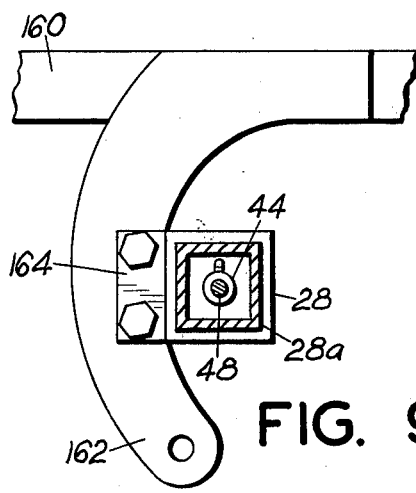

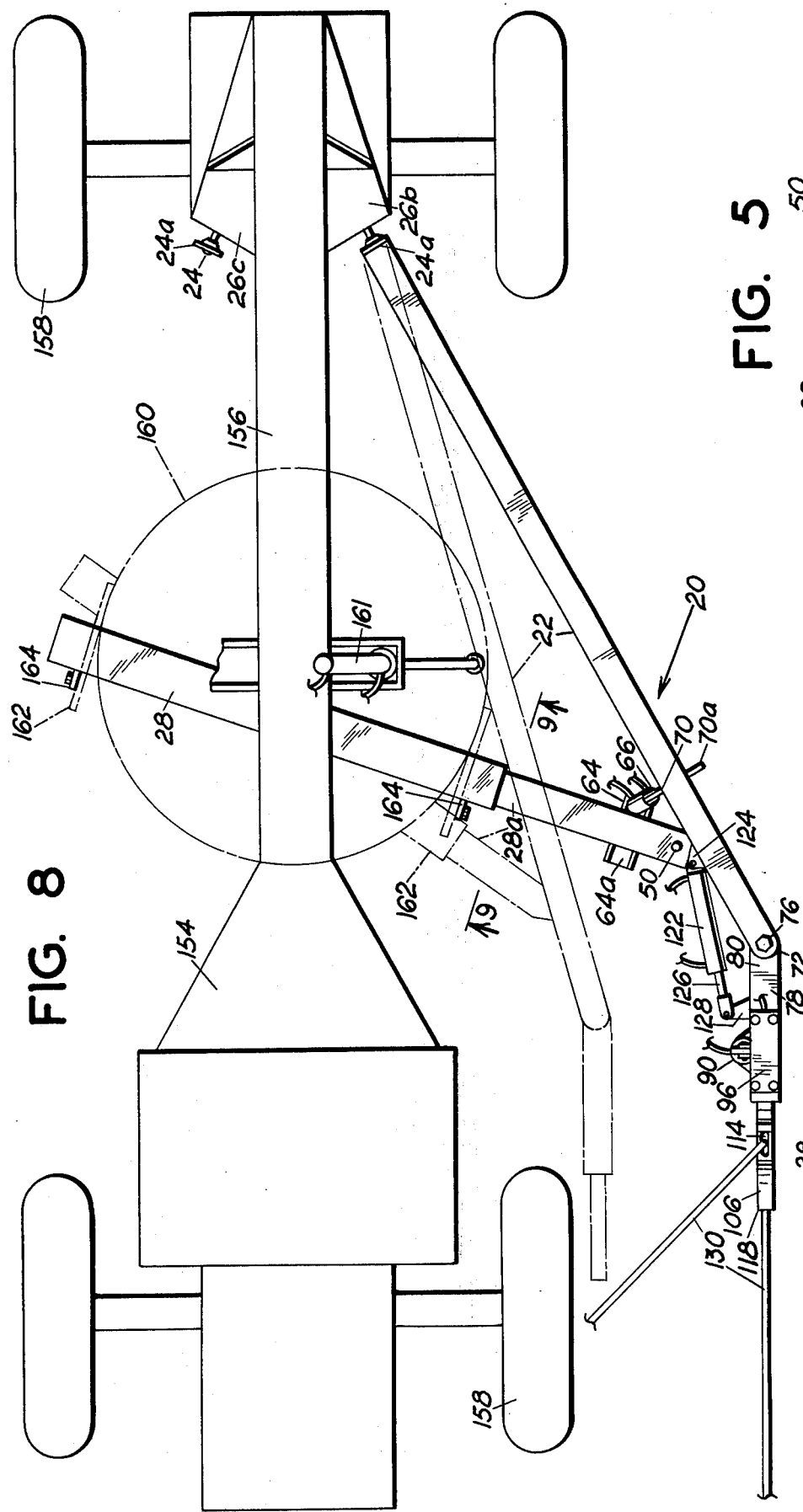
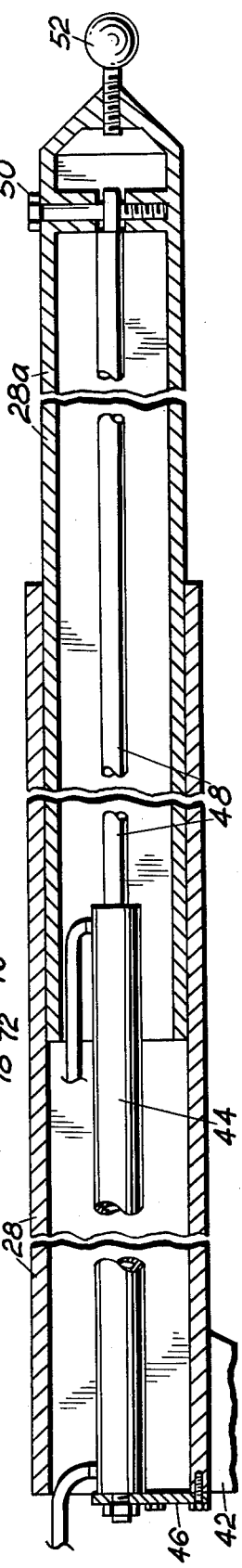

CABLE LAYING ATTACHMENT FOR VEHICLES

BACKGROUND OF THE INVENTION

Apparatuses have heretofore been developed for continuously laying a cable in the ground as a carrier vehicle travels over the ground. One such device is illustrated in my U.S. Pat. No. 3,486,344 directed to an attachment for a road grader vehicle capable of laying the cable as the road grader is driven along a desired path. The apparatus shown in my previous patent was intended for use with a road grader. Other types of vehicles have been found to operate as satisfactorily in a cable laying attachment as a road grader and it is desired that an attachment have a versatility such that it will not require a special vehicle on which to be supported.

SUMMARY OF THE INVENTION

According to the present invention and forming a primary objective thereof, a cable laying attachment is provided having a combination structure thereon which makes it available for mounting on substantially any type of vehicle such as tractors, road graders and the like.

A more particular object of the invention is to provide a cable laying attachment of the type described utilizing an elongated beam member with a front universal bracket arranged for securement to a forward portion of substantially any vehicle and a rear support arm arranged to support the beam member at a rearward portion of the vehicle and also arranged to move the rearward portion of the beam member to any desired outward position.

Another object is to provide a cable laying attachment of the type described having a novel structural arrangement facilitating mounting thereon on either side of a vehicle.

Another object is to provide in combination with such attachment warning and vehicle shut-off means arranged to warn the operator that the cable is not being fed properly from the supply and also arranged to shut down the vehicle if the feeding of the cable from the supply reaches a sudden resistance that may damage the cable, or if the operator has not heeded the warning.

Another object of the present invention is to provide a cable laying attachment which is simplified in construction and capable of ready attachment to a vehicle.

The invention will be better understood and additional objects and advantages will become apparent from the following description taken in connection with the accompanying drawings which illustrate preferred forms of the device.

BRIEF DESCRIPTION OF THE DRAWINGS

FIG. 1 is a side elevational view of the present attachment showing the same mounted on a crawler-type tractor;

FIG. 2 is a fragmentary top plan view of FIG. 1 taken on the line 2—2 of FIG. 1 and showing in full lines the attachment in extended outward position and in broken lines the same in an inward position, a portion of this view being broken away to show mounting structure;

FIG. 3 is a rear elevational view taken on the line 3—3 of FIG. 1 and showing in full lines a vertical position of the plow blade carrier and in broken lines a tilted position thereof;

FIG. 4 is an enlarged fragmentary elevational view taken on the line 4—4 of FIG. 2;

FIG. 5 is an enlarged sectional view taken on the line 5—5 of FIG. 2;

FIG. 6 is an enlarged fragmentary sectional view taken on the line 6—6 of FIG. 1;

FIG. 7 is an enlarged fragmentary sectional view taken on the line 7—7 of FIG. 1;

FIG. 8 is a top plan view of the present attachment mounted on a road grader vehicle;

FIG. 9 is a fragmentary sectional view taken on line 9—9 of FIG. 8; and

FIG. 10 shows a modified form of connection between the elongated beam member and the support arm.

DETAILED DESCRIPTION OF PREFERRED EMBODIMENTS

With particular reference first to FIGS. 1, 2 and 3, the numeral 10 indicates in general a well known type of tractor having crawler track means 12 and a rear load plate 14 utilized to support or connect various types of loads or attachments.

The cable laying attachment of the present invention is designated generally by the numeral 20 and includes an elongated composite beam member or main frame 22 shaped substantially as best seen in FIG. 1. The forward end of this beam member is connected by universal joint means, for example by a ball and socket 24 to a bracket 26 which when the attachment is mounted on the vehicle is firmly secured as by welding or other suitable means to the side of the vehicle. In the use of the attachment with a crawler-type tractor the bracket 26 is attached to the track structure 12.

The beam member 22 is supported adjacent its rearward end by a tubular support arm 28, also seen in FIG. 5, having a telescoping extension 28a. The base end of the support arm 28 has a universal support connection to the load plate 14, and to accomplish such universal connection, an upright plate 30 having a pair of outwardly projecting lugs 32 is bolted to the load plate 14. These lugs have a pivot connection with lugs 34 on a bracket 36. This bracket also has upper and lower pairs of vertically disposed lugs 38 and 40, respectively. Support arm 28 is provided at its base end with a pair of lugs 42 having a pivot connection with upper lugs 38. The universal support of the arm 28 is thus accomplished by means of the horizontal axis pivot connection between the lugs 38 and 42 and by the vertical axis pivot connection between the lugs 32 and 34.

With particular reference to FIG. 5, the telescoping extension 28a is also tubular and has slidable guided movement within tubular support arm 28. Powered movement of the extension 28a relative to the arm 28 is accomplished by a double acting fluid cylinder 44 confined within the arm and having its base end secured to a wall portion 46 on the base end of the arm 28. The outer end of piston rod 48 of the cylinder 44 is pivotally attached to a cross stud 50 at the outer end of the extension. Such extension has a ball and socket connection 52, FIG. 6, with a base block 54 secured on one side or the other of an upright double beveled bracket portion 56 integral with the beam member 22. The block 54 and bracket 56 are arranged such that the block can be bolted to either side of the bracket so that the extension 28a can lead in from either side of the beam member 22 and as will be more apparent hereinafter, the attachment can be mounted on either side of the vehicle. By selective operation of the fluid operated cylinder 44, the support arm 28 can be extended and shortened for positioning the rearward end of the beam 22 a selected distance from the vehicle.

Arm 28 is supported from underneath by a fluid operated cylinder 58 having its base end pivotally attached to the lugs 40 and having the outer end of its piston rod 60 pivotally connected to depending lugs 62 extending in depending relation from the outer end of arm 28. By suitable operation of the fluid operated cylinder 58, the arm 28 and consequently the beam member 22 can be raised or lowered as desired, either to a lowered operating position or an upper vehicle traveling position. Fluid operated cylinder 58 also serves to hold the arm down during the cable laying process as will be more apparent hereinafter.

As best seen in FIG. 2, the outer end portion of the arm extension 28a has integral bracket means 64 to which the base end of an upwardly extending fluid operated cylinder 66, also seen in FIGS. 3 and 4, is attached. The piston rod 68 of this cylinder is pivotally connected to lug means 70 on an upper portion of the beam member 22. By operation of cylinder 66, the beam can be tilted on a longitudinal axis, such tilting support being on the ball and socket joints 24 and 52. Bracket means 64a are provided on the opposite side of extension 28a from bracket means 64 and lug means 70a are provided on the opposite side of beam member 22 from lug means 70 to provide opposite side connection between extension 28a and beam member 22, as will be more apparent hereinafter.

A plow blade carrier, a plow, and a cable shoe are carried at the rear end of the beam member 22 of the attachment, FIGS. 1–4. For this purpose, the rearward end of the beam member 22 is formed with upper and lower rearwardly extending lugs 72 and 74, respectively, which carry a hinge pin 76. A plow blade carrier 78 has a pair of forwardly extending lugs 80 through which the hinge pin 76 passes, thus providing a hinged mounting on the end of the beam member 22 for the plow blade carrier. A rectangular channel 82, FIG. 6, extends down through the carrier 78 to slidably receive a plow blade 84, also seen in FIG. 7, comprising an elongated shank and a sharpened forward leading edge 86 terminating at the bottom in a forwardly, downwardly extending tooth 88. With particular reference to FIGS. 3 and 4, a double acting fluid cylinder 90 is attached at its base end to the inside face of the carrier 78 and has its piston rod 92 connected at its top end to a top cap 94 on the plow blade 84. By selected operation of the cylinder 90, the plow blade can be raised or lowered with respect to the carrier.

A fluid operated vibrator 96 of conventional construction is secured to the top cap 94 of the plow blade 84 for producing a vibration to the blade and assist its movement through the ground. Preferably, the vibrator is of the type that creates vertical forces.

The rear end of the rectangular channel 82 on the carrier 78 is closed by an end plate 100, FIG. 6, formed with an exterior guideway 102, also seen in FIGS. 1 and 3, for a keeper or slide member 104. A cable guide shoe 106 is hingedly attached to the lower portion of the rear edge of the plow blade 84 by hinge connections 108 and 110 and is also hingedly attached to the keeper 104 by a hinge connection 112. The cable guide shoe 106 is thus pivotally movable on a vertical axis relative to the plow blade 84 and at the same time raises and lowers with such plow blade. The cable guide shoe 106 is shaped as shown in FIG. 1 and has a cable guide chute 114, FIG. 6, extending downwardly therein through the top. The bottom end of the cable guide shoe has a rearward extension 118, and the cable guide chute in the shoe turns rearwardly through this extension so that cable can be fed down through the shoe and substantially horizontally out the trailing end thereof. The cable guide shoe 106 has a forward sharpened edge 120.

During the course of the plowing, it may be desired to hold the plow blade carrier in a straight longitudinal position relative to the path of movement of the tractor or even to angle it relative to such path if necessary, and for this purpose a double acting fluid operated cylinder 122, FIGS. 2 and 4, is pivotally connected at its base end to lug means 124 on an inside portion of the beam member 22 and has its piston rod 126 pivotally connected to inwardly extending lug means 128 on the carrier 78. By suitable operation of the cylinder 122 the carrier can be positioned longitudinally relative to the beam member as desired.

Cable 130 to be fed through the shoe 106 is supplied from a drum 132, FIG. 1, supported on arms 134 hingedly attached to the front of the tractor. The arms 134 are supported by one or more fluid operated cylinders 136 also secured pivotally to the front of the tractor and having their piston rods secured outwardly on the arms so that the latter can be raised and lowered to position the drum 132 as necessary for loading and for paying off cable 130. The cable leads rearwardly through a fair-lead 138 supported on a post 140 secured to the rearward end of the tractor. A hinged arm 142 on the post ends in a yoke in which a guide pulley 143 is mounted and over which a cable passes. The hinged arm 142 is resiliently supported through the medium of a pair of telescoping brace members 144 the telescoping action of which is resisted by a compression coil spring 145. When the cable is not being properly dispensed from the mounting drum or when there is too much tension on the cable, this fact will be indicated by the lowering of the pulley 143 and arm 142 against the force of the spring 145.

In a laying operation of the cable by traveling movement of the vehicle in the desired path, the cable is fed from the drum through the fair-lead 138, over the pulley 143, and into the guide chute 114 in the shoe 106. The beam member 22 is positioned as necessary relative to the tractor in an outwardly directed position by suitable expansion of the support arm 28 through the medium of cylinder 44. FIG. 2 shows in full lines an outward swung position of the beam member 22 for laying cable and such view also shows in broken lines an inward position which also may be used for laying cable but primarily comprises a position of non-use for traveling. The vertical positioning of the beam member 22 is accomplished by the support arm 28 through the medium of cylinder 58. The desired depth of the plow blade 84 in the ground is accomplished by suitable actuation of cylinder 90, and as stated hereinbefore, the cylinder 58 that raises and lowers the arm 28 will also hold said arm and consequently the beam 22 downwardly so that the latter will not raise upward during a plowing operation. In the cable laying function, the carrier 78 is held in a selected longitudinal position relative to the beam member, generally in alignment with the direction of the laying path, by suitable operation of cylinder 122.

While the beam 22 is generally in a substantially vertical position during the cable laying operation, it may be desired to tilt the beam to avoid an obstruction or for other purposes. To accomplish such tilting function, it is merely necessary to actuate fluid operated cylinder 66 as necessary. FIG. 3 shows a tilted position of the beam member in broken lines. Cylinder 66 also serves to firmly hold the beam member in the desired upright position. If necessary, the vibrator 96 can be placed in operation to assist movement of the plow blade through the soil.

With particular reference to FIG. 2, a bracket 26a is also secured to the other side of the tractor so that the cable laying mechanism can be mounted on the other side of the tractor as well. For this purpose, the beam member 22 has a similar ball and socket connection 24 with the bracket 26 as already described and the ball and socket connection 52 and base 54 for the telescoping extension 28a will merely be bolted to the other side of the bracket portion 56. The arm 28 is swung over to the left side in such opposite support, and the fluid operated cylinder 66 in this support position is attached to bracket means 64a and lug 70a instead of to bracket means 64 and lugs 70.

The lug 126 is of sufficient length such that even though the beam member 22 is disposed on the left side of the tractor, the carrier 78 can be angularly positioned either straight or angularly relative to the beam member.

To avoid damage to the cable in the event that it is subjected to a dangerous tension thereon for any reason, safety means are provided on its feed means. One safety device comprises a buzzer mechanism 146 secured on the post 140 and arranged for engagement if the arm 142 is pulled down a slight amount, as would occur if only a slight but undesirable tension acts on the cable. The operator would probably only have to slow the vehicle or at worst stop the vehicle and research the cause of the unnecessary tension.

Another safety device comprises a vehicle shut-off arrangement which stops the vehicle without any control from the operator. This latter safety device comprises a flexible cable 148 connected at one end to an extended portion 142a of arm 142 and at its other end to a lever 150 suitably connected to the governor, fuel supply, etc. in a conventional arrangement so as to shut off the engine when rotated. Thus when the arm 142 is pulled down as by a hard tension on the cable, and the operator has not corrected the problem upon sounding of the buzzer mechanism 146, the vehicle will be automatically stopped.

FIGS. 8 and 9 illustrate the versatility of the present invention in that it can be adapted for use with other vehicles such as a road grader, it only being necessary that the vehicle have means to which the beam member can support its front ball and socket connection and to support the arm 28 in a rearward position. To further illustrate this adaptation, a road grader 154 is shown somewhat diagrammatically and has a main frame 156 supported by forward and rearward wheels 158. The road grader has the customary guide and support frame 160 which is rotatably supported on the main frame 156 and conventionally supports a moldboard or scraper blade not shown. The guide frame 160 is tiltable laterally as well known in the art, such as by up-right fluid operated cylinders 161, whereby when normally functioning as a road grader the moldboard can be tilted laterally. Although the moldboard is not shown in the drawings, the mounting brackets 162 for attaching it to the guide frame 160 are shown. Such brackets depend integrally from each side of the guide frame 160, and for purposes of the present invention, the support 28 is bolted to a lower end of such brackets by brackets 164 integral therewith. The support arm 28 is thus supported laterally on the road grader and has lateral tilting with the guide frame 160.

The road grader is provided with a bracket 26b at the forward end thereof, and such bracket has a ball and socket connection 24a with the beam member 22 for supporting the latter at the front.

The structure of the cable laying attachment of FIG. 8 is the same as in FIG. 1 except that the arm supporting cylinder 58 is not utilized. Instead, as described the arm 28 has support on the guide frame 160 and is tiltable therewith. The arm 28 can be extended through the medium of cylinder 44 as in FIG. 1 to selectively position the beam member 22 outwardly, the cylinder 66 being actuated to tilt the beam, the cylinder 122 being actuated to properly angle the plow blade carrier 78, and the cylinder 90 being actuated to properly position the plow blade vertically. The cable laying apparatus can be mounted on the left side of the road grader as explained before in connection with the embodiment of FIG. 1, the road grader having a front bracket 26c on the left side to accommodate such mounting. The arm 28 in the left side mounting is bolted onto the bracket 162 so that its extension 28a extends out that side, and the cylinder 66 is attached to bracket means 64a and lugs 70a instead of to bracket means 64 and lugs 70.

The pump means and conduit arrangement for the various cylinders are not shown in detail since such is common in the art.

FIG. 10 illustrates a modified form of ball and socket connection 52' for connection of arm extension 28a to beam 22' from either side. In this embodiment, the beam 22' has a projection 168 on a vertical portion thereof, and this projection receives a pin 170 that passes down into a lower portion of the beam. A bracket 56' for the ball and socket connection is rotatably mounted on the pin 170 and is available for bolting connection with the ball portion 52 FIG. 6, for either side mounting of the beam by merely rotating it to face its socket toward the appropriate side.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described by invention, I claim:

1. A cable-laying vehicle comprising
   a. a longitudinal frame supported on movable means,
   b. an elongated main frame,
   c. a plow blade carrier mounted on the rear end of said main frame,
   d. a plow blade supported by said carrier,
   e. a cable guide shoe supported by said carrier,
   f. cable feed means on said vehicle for feeding cable to said guide shoe, g. first universal joint means arranged to connect the forward end of said main frame with a front portion of the vehicle at one side, h. a laterally extending support arm on said vehicle, i. said arm comprising a rigid tubular base portion telescopically receiving a rigid tubular extension in guided relation and a double acting fluid operated cylinder interconnected between said base portion and said extension interiorly thereof and arranged to vary the length of said support arm, j. second universal joint means at one end of said support arm connecting said end to a rearward point on said main frame, k. and means at the other end of said support arm arranged to connect said other end to a rearward point of said vehicle, l. said support arm in its length adjustment being capable of positioning said main frame selected distances at the rear away from said vehicle.

2. The cable laying vehicle of claim 1 including universal joint means on each side of said vehicle wherein said main frame is arranged to be connected on either side of said vehicle, said second universal joint means being movable from one side of said main frame to the other to accommodate mounting of the latter on said either side of said vehicle.

3. The cable laying vehicle of claim 1 wherein said vehicle comprises a crawler type tractor and has side track frames, said first universal joint means being connected to a forward portion on said track frames, and a double acting fluid operated cylinder arranged to be connected at one of its ends to said vehicle below the connection of said other end of the arm with the vehicle and connected at its other end to said arm whereby upon actuation of the said cylinder it can raise or lower said main frame.

4. The cable laying vehicle of claim 1 wherein said vehicle comprises a road grader having a tiltable moldboard guide and support frame, said first universal joint being connected to a forward point on said road grader, and means securing said support arm to said moldboard guide and support frame.

5. The cable laying vehicle of claim 1 including cable supply means on said vehicle cable guide means on said vehicle between said cable supply means and said cable guide shoe, said cable guide means including a resiliently supported arm arranged in a normal cable feeding operation to project outwardly at a selected angle but to be pulled downwardly by the cable in the event an abnormal tension acts on said cable in a cable feeding operation, and signal means in the path of said arm actuated in a selected downward position of said arm to emit a warning signal.

6. The cable laying vehicle of claim 5 including link means connected between said arm and engine control means and arranged in a selected downward pivoted position of said arm past the position at which the signal is actuated to move the engine control means to an engine shut-off position.

7. The cable laying vehicle of claim 1 including cable supply means on said vehicle, cable guide means on said vehicle between said cable supply means and said cable guide shoe, said cable guide means including a resiliently supported arm arranged in a normal cable feeding operation to project outwardly at a selected angle but to be pulled downwardly by the cable in the event an abnormal tension acts on said cable in a cable feeding operation, and link means connected between said arm and engine control means and arranged in a selected downward pivoted position of said arm to move the engine control means to an engine shut-off position.

* * * * *